Sept. 18, 1962 W. P. CHRISTOPH 3,054,592

HYDRAULIC GEOPHONE AMPLIFIER WITH BAND-PASS FILTER

Filed Aug. 7, 1956 3 Sheets-Sheet 1

INVENTOR
W. P. CHRISTOPH

BY
G. D. O'Brien
W. O. Quesenberry
ATTORNEYS

HYDRAULIC GEOPHONE AMPLIFIER WITH BAND-PASS FILTER

Filed Aug. 7, 1956 3 Sheets-Sheet 2

INVENTOR
W. P. CHRISTOPH

BY G. D. O'Brien
W. O. Quesenberry
ATTORNEYS

INVENTOR
W. P. CHRISTOPH

BY E. D. O'Brien
W. O. Quesenberry
ATTORNEYS 3,054,592
Patented Sept. 18, 1962

3,054,592

HYDRAULIC GEOPHONE AMPLIFIER WITH BAND-PASS FILTER

Walter P. Christoph, Riverdale, Md., assignor to the United States of America as represented by the Secretary of the Navy Filed Aug. 7, 1956, Ser. No. 602,678
7 Claims. (Cl. 251—61)
(Granted under Title 35, U.S. Code (1952), sec. 266)

The invention described herein may be manufactured and used by or for the Government of the United States of America for governmental purposes without the payment of any royalties thereon or therefor.

This invention relates to a band-pass filter system and apparatus for adapting a hydraulic amplifier for use as a geophone and for providing improved operation at selected band-pass acoustic frequencies for detection thereby.

More specifically, the invention relates to band-pass filter arrangements for use with hydraulic amplifiers of either the single-ended or push-pull variety as shown and described in greater detail in the copending Walter P. Christoph application, Serial No. 568,685, filed February 29, 1956, now Patent No. 2,824,292.

The band-pass filter arrangements of the instant invention are well adapted for use for hydraulic amplification of pressure signals in the audio and sub-audio frequency ranges down to and including static pressures when utilized with the foregoing types of hydraulic amplifiers to provide for the efficient conversion of sound velocity signals to pressure signals in the audio and sub-audio frequencies ranges. Further, the amplifier circuitry is well adapted for use with electrolytic detecting and transducing devices for transducing the pressure signals into electrical signal energy and are preferably utilized with such detectors in a hydraulic bridge rectifying circuit for the electrolytic detectors.

The invention further relates to an improved system for conversion of alternating input signals to pressure signals wherein amplification of the signal may be obtained within the band of the vibratory system of the instant band-pass filters.

While prior art systems have utilized the driving of a mass from a signal source to provide a filtering, of a mechanical or mechanical-hydraulic nature as the case may be, of a signal, these devices have not heretofore been utilized in combination with the new and novel hydraulic amplifier disclosed in the aforementioned copending application.

Also, while it is preferable to use an electrolytic detector and hydraulic bridge rectifying circuit for deriving an electrical output from the system, it is to be understood that other types of pressure-to-electrical transducers, such for example as crystal hydrophones, may be utilized without departing from the scope of the instant invention. The hydraulic amplifier power system generally incorporates a hydraulic power supply, a plurality of resistance or inductive inertance means as, for example, capillaries and/or tubes, and/or capacity means such as bellows or diaphragms, together with a hydraulic transducer of a character adapted to provide sensitivity to physical movements of the mass therein and thereafter convert such movement to pressure signals by changing the hydraulic impedance of the system according to the signals impressed at the input of the system. The band-pass filter characteristics of the system are obtained by impressing the signals on a diaphragm which functions to drive a vibrating system. This vibrating system comprises a mass of predetermined magnitude, disposed to couple the filtered signals to the diaphragm which drives the reed or band of the hydraulic amplifier. The utilization of two such vibratory systems characterized by different resonant frequency characteristics, provides an attenuation of both the lower and higher signal frequencies outside the desired pass band. The resonant character of the vibrating masses may provide a peak in the characteristic curve of the system and which may or may not provide amplification of the signal in the pass band frequencies of the amplifier, depending on the values of the components and masses used.

One object of the instant invention resides in the provision of means including a hydraulic amplifier for providing improved band-pass characteristics for a system for the detection of low frequency hydro-acoustic pressure signal intelligence.

Another object resides in the provision of a system utilizing a vibrating mechanical mass system in combination with improved hydraulic amplifying circuitry for acoustic pressure signal intelligence wherein said filtering is obtained prior to transduction of said intelligence into electrical signal intelligence.

A further object of this invention resides in the provision of a band-pass filter arrangement which may be utilized either with a single-ended hydraulic amplifier or a push-pull hydraulic amplifier.

It is also an object of the invention to efficiently combine a band-pass filter, a hydraulic amplifier, and a low frequency electrolytic detector in a full-wave bridge rectifying circuit for providing improved attenuation of acoustic and sub-acoustic signal intelligence outside of a desired frequency band.

Another object is to provide an improved band-pass filter for a hydraulic amplifier utilizing a vibratory system of masses in which some amplification of the signals may be obtained prior to the application of the filtered signals for driving of the input of the hydraulic amplifier.

Another object resides in the provision of a new and novel combination of hydro-acoustic amplifier and detector system together with a plurality of vibrating mass systems for providing band-pass filtering of audio and sub-audio frequency signals and which substantially overcomes many of the shortcomings, including low frequency insensitivity, of prior art underwater sound pressure detection systems while providing substantially all of the advantages thereof.

Other objects and many of the attendant advantages of this invention will be readily appreciated as the same becomes better understood by reference to the following detailed description when considered in connection with the accompanying drawings wherein.

Figure 1:
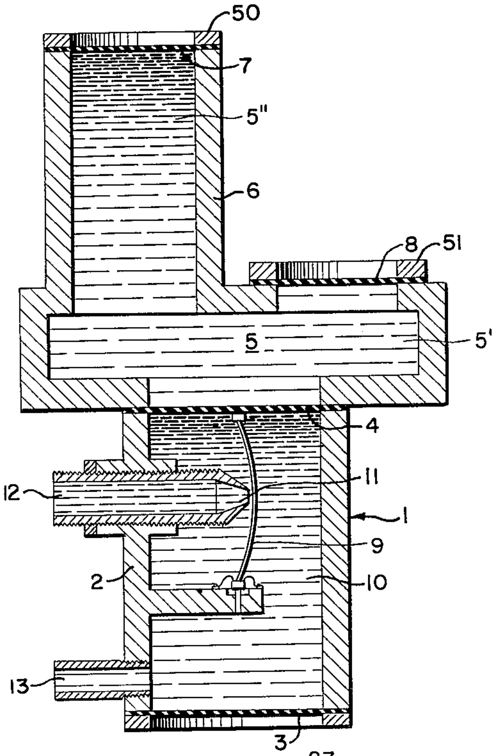
FIG. 1 is a generally diagrammatic illustration in vertical section of one embodiment of a band-pass filter connected in a manner to drive a single-ended hydraulic amplifier.

Referring now to FIG. 1 of the drawings there is shown a single-ended hydraulic amplifier generally indicated at 1 and comprising a casing 2 for enclosing a main volume of fluid therein at 10. The rear portion of this housing is closed by a compliant diaphragm 3 while the forward end of the amplifier housing 2 is closed by the main or driving diaphragm 4 which provides coupling with the enclosed volume at 5 disposed within a band-pass filter front housing 6. The front volume 5 is filled with a fluid of predetermined viscosity and includes two fluid masses 5′ and 5″ which provide hydraulic inductances. The main diaphragm 4 and the two front diaphragms 7 and 8 disposed respectively in the front end and the front face of the band-pass filter housing 6 provide acoustic-capacitances for the band pass filter while the front diaphragm 7 further provides signal communication from a signal source external to the system to the mass of coupling fluid disposed in the band-pass filter at 5. The main volume 10 enclosed by the casing 2 contains the assembly of elements which forms the hydraulic amplifier. The hydraulic amplifier per se is not the subject of the instant invention since the details thereof are claimed in the copending Christoph application supra. The details of the hydraulic amplifier, which are shown with the band-pass filter and amplifier housing for purposes of providing a better understanding of the invention, comprise a flexible slightly prebent reed or band 9 which is disposed in closely spaced adjacency to the fluid discharge nozzle 11 with a suitable adjustment means not shown being provided therefor. The flow direction is from the input at 12 for the nozzle 11 to the chamber 10 and out the output outlet 13. The inlet 12 and outlet 13 are connected to a closed hydraulic circuit not shown, but which may include a pump or other suitable means for circulating fluid in the system and a suitable detector and transducer connected in shunting relation to the flow path of the system.

Figure 2:
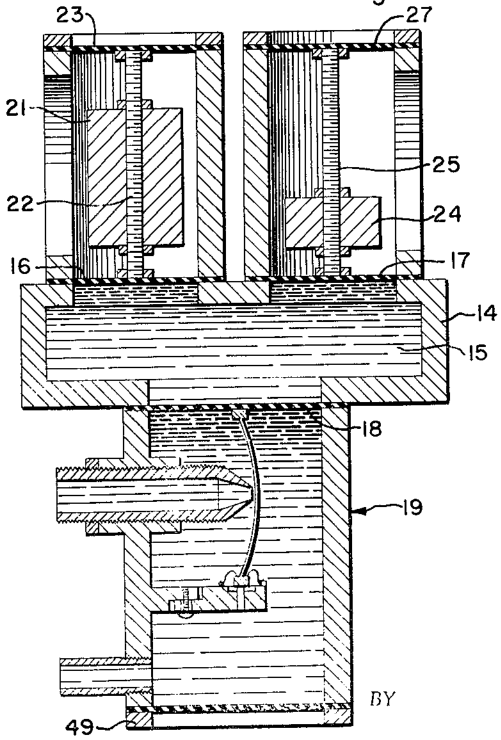
FIG. 2 is a generally diagrammatic illustration in vertical section of a band-pass filter utilizing rigid masses and hydro-acoustic capacitance elements to provide band-pass filtering for a single-ended hydraulic amplifier.

Referring now to FIG. 2 there is shown an alternate embodiment of the band-pass filter system, utilizing somewhat different elements therein. The casing 14 for the front volume at 15 is closed by the front housing diaphragms 16 and 17. The filtered input signal is coupled through the fluid therein to the main or driving diaphragm 18 for the hydraulic amplifier at 19. The two diaphragms 16 and 17 are connected to one of the plurality of vibrating mass systems to be described. The first filter system comprises a first mass 21 disposed on a rod 22 for damping the driving of the diaphragm 16 when diaphragm 23 is subjected to an acoustic input signal applied thereto, and a second vibratory mass system comprising a smaller mass 24 is disposed on the rod 25 which is connected between the pair of diaphragms 17 and 27. This filter system is connected in shunt with the fluid at 15 which couples the signal to the amplifier diaphragm 18. As is with the case of the system of FIG. 1, the front volume casing 14 is filled with a suitable fluid at 15 of predetermined viscosity. The rods 22 and 25 are fixedly attached at the opposite ends thereof to the diaphragms 16, 23 and 17, 27 respectively.

The operation of the band-pass filter apparatus of the FIG. 1 is such that the diaphragms 8, 4 and 3 provide a combined mechanical capacitance. These diaphragms together with the enclosed fluid mass in the front volume 5 and in the main volume at 10 and depending on the fluid viscosity of volumes 1 and 5, provides a predetermined vibrating system with a certain resonant frequency and damping characteristics. The combination of the diaphragms 7, 4 and 3 represents another mechanical capacitance, and when considered as including different portions of the volumes 5 and 10 provides a second filter systems having a different resonant frequency. The form and cut off characteristics of the individual resonance curves are determined by the values of the masses, diaphragms stiffness and the damping characteristic of the fluid which may be varied according to the fluid viscosities thereof.

Figure 3:
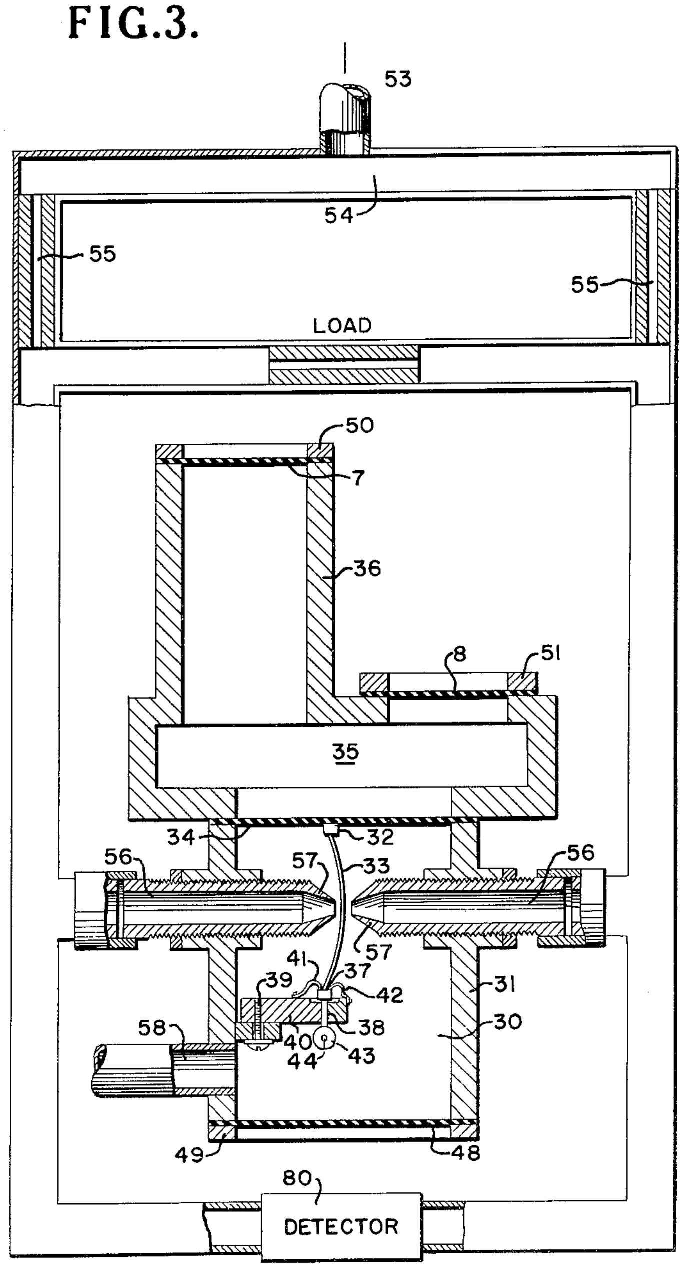
FIG. 3 is a diagrammatic illustration generally in vertical section and with parts broken away of a filter of the character of FIG. 1 coupled to drive a push-pull or double-ended amplifier of a preferred embodiment of the instant invention.
Figure 4:
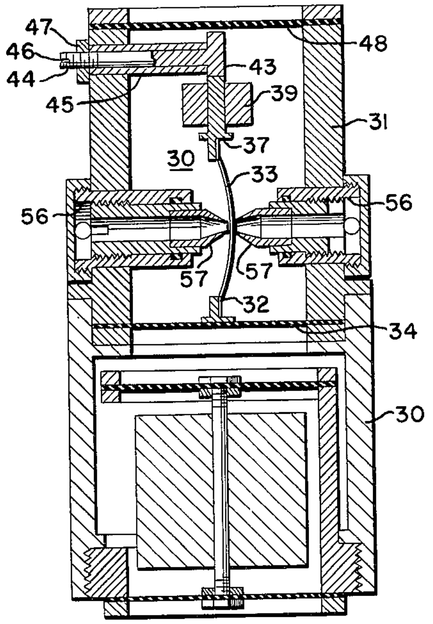
FIG. 4 is a generally diagrammatic sectional illustration in front elevation of a system utilizing a band-pass filter generally similar to that of FIG. 2 for driving a push-pull hydraulic amplifier of the character of FIG. 3.
Figure 5:
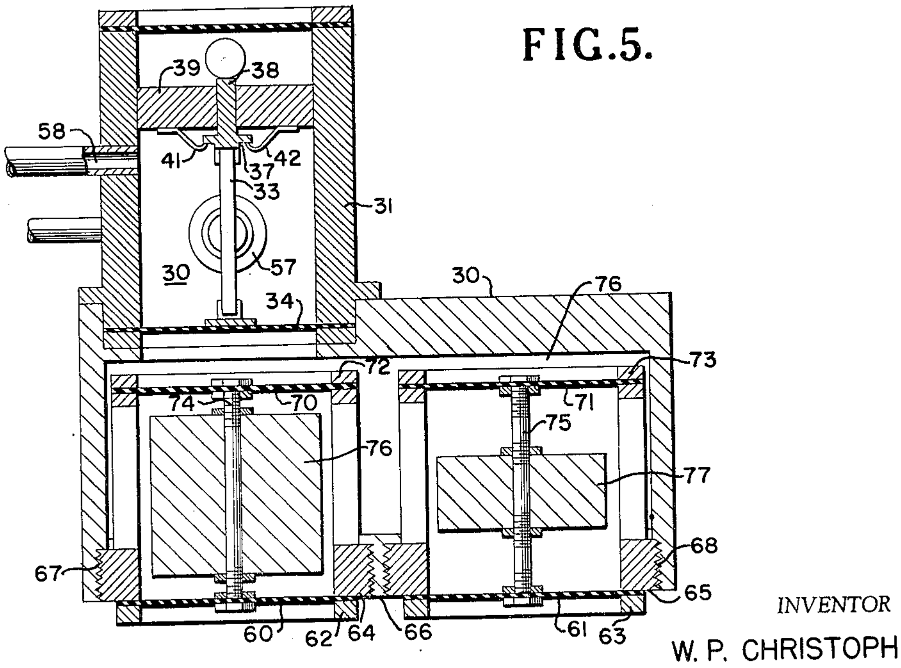
FIG. 5 is side elevation view of the amplifier and filter of FIG. 4 with parts thereof in section and broken away.

Referring now to FIGS. 3, 4 and 5 for a showing of the push-pull hydraulic amplifier and band-pass filter arrangements which are essentially the same as hereinbefore described with respect to FIGS. 1 and 2, the band-pass filter housing 36 is fixedly connected to the amplifier housing 31 with the fluid enclosed in the two housings at 35 and 30 respectively, being separated by means of the main diaphragm at 34. This diaphragm carries a mount at 32 for the flexible reed or prebent band 33. The band 33 is connected at the opposite ends thereof to the slidable band mount 37. This lower band amount 37 is slidably received in a suitable bore 38 in the transverse support member 39 which in turn is carried by suitable adjustment means at 39 and mounted on a boss 40 in the housing 30. It is suitably biased by springs 41 and 42 to position the band mount 37 against the adjustable cam 43 which is rotated to vary the degree of prebending of the band to obtain an optimum adjustment thereof. This is accomplished by means of the adjustment shaft 44 which is fixed to or made integral with the cam 43. The adjustment rod details as shown in greater detail in FIG. 4 include a bearing element 45 and may be provided with a knob if desired or a screw driver slot as shown at 46. The cam adjustment is provided with a locking device such as a locknut as shown at 47. The rear of the amplifier housing 31 is closed by the rear diaphragm 48 which is attached to the housing by means of a suitable clamping ring 49. This clamping ring as well as clamping rings 50 and 51 for diaphragms 7 and 8 respectively may be screwed or otherwise fixedly attached to their respective housings.

Referring again to FIG. 3 the fluid flowing in the external closed circuit enters the amplifier circuit at 53 and flows through, the T tube 54 where it is divided into flow paths, each of which includes a resistance tube 55. Each flow path is connected to provide flow through the nozzle tube at 56 to the respective nozzle 57. FIG. 5 shows one of the nozzles 57 partly covered by the precurved band 33. The fluid passes through the nozzle tube 56 and nozzle 57 into contact with its respective side of the band 33 and thereafter flows from the amplifier housing 31 into the outlet tube 58.

The band-pass housing 30 of FIGS. 4 and 5 is closed by the diaphragms 60 and 61 which are held in position by suitable clamping rings 62 and 63, respectively. The diaphragms 62 and 63 are mounted on the diaphragm holders 64 and 65 which are screwed into the housing at 66 by the threaded connection at 67 and 68, respectively. Diaphragms 70 and 71 are mounted on the inner end portions of the holders 64 and 65 and are held in place by means of clamping rings 72 and 73 which may be attached to holders 64 and 65 in any suitable manner, not shown. The two pairs of diaphragms 60, 70 and 61, 71 are rigidly connected by the rods 74 and 75 respectively which carry the inertial masses 76 and 77 thereon. The space at 76 is filled with fluid of a suitable viscosity in order to provide a damping and band-pass coupling of the fluid volume at 76 to the amplifier volume 30 which is filled with the fluid supplied by the pump not shown but which is used to operate the hydraulic amplifier.

A suitable detector-transducer is connected into the external circuit of the amplifier as indicated generally at 80.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. In combination, a hydraulic power amplifier and a hydro-mechanical band pass filter, said filter comprising a first vibratory system of predetermined resonance for providing attenuation of signal frequencies below said band to be passed, and a second vibratory system of predetermined resonance characteristics for providing attenuation of signal frequencies above the band to be passed and amplified by said amplifier, and means for coupling said filter to said amplifier.

2. In combination, a hydraulic power amplifier and hydro-mechanical band-pass filter, said filter comprising a first vibratory system of predetermined resonance for providing attenuation of signal frequencies below said band to be passed, and a second vibratory system of predetermined resonance characteristics for providing attenuation of signal frequencies above the band to be passed and amplified by said amplifier, said first and second vibratory systems comprising a plurality of fluid masses enclosed by a plurality of hydraulically compliant capacitance elements.

3. In combination, a hydraulic power amplifier and hydro-mechanical band-pass filter, said filter comprising a first vibratory system of predetermined resonance for providing attenuation of signal frequencies below said band to be passed, and a second vibratory system of predetermined resonance characteristics for providing attenuation of signal frequencies above the band to be passed and amplified by said amplifier, said first and second vibratory systems each comprising a rigid mass and means for coupling said masses to said amplifier.

4. The structure of claim 3 further characterized by the combination of means for driving said masses in response to the application of input signals thereto.

5. The structure of claim 4 further characterized by the inclusion in said amplifier of a substantially enclosed chamber, an additional diaphragm disposed to close the amplifier chamber at the end thereof remote from said common diaphragm and provide therewith a compliance for said hydraulic amplifier, the compliance of said diaphragm functioning together with the diaphragms of each of said filter chmbers and the hydraulic fluids enclosed in the combined system to provide an additional vibratory system which cooperates with the aforementioned systems to provide predetermined band pass characteristics for said combined system.

6. A band pass filter system for use in combination with a hydraulic amplfier of the character described which comprises, means providing a plurality of mutually communicating fluid chambers, a compliant diaphragm disposed to close one end of each of said chambers, each of said chambers being of different volumetric capacity and enclosing a fluid volume to provide a plurality of vibratory systems when one of said diaphragms is subjected to acoustic input signal intelligence influences, an additional diaphragm disposed to be common to all of said chambers and to the input of said hydraulic amplifier to provide coupling of filtered signals as frequency attenuated by said filter to the hydraulic amplifier.

7. In combination with a hydraulic power amplifier of a character incorporating means providing a first closed chamber with means for terminating an inlet and outlet connected thereto, said inlet with a fluid nozzle, a pair of diaphragms for closing a pair of opposite ends of said chamber, a thin ribbon-like band mounted at one end thereof on a first of said diaphragms, for movement therewith and disposed in close spaced adjacency to said nozzle, for controlling flow discharge from said nozzle in correlation with contemporaneous movement of said diaphragm and band, means for resiliently fixing the opposite end of said band within said chamber, and a plurality of filter systems comprising vibratable masses and mechanical compliances, means for coupling said filter systems to said first diaphragm of the amplifier, and means including a compliant element for initiating vibration of said vibratable masses in response to the application to said last named means of acoustic signal influences from a source external thereto.

References Cited in the file of this patent

UNITED STATES PATENTS

| | | |
|---|---|---|
| 946,096 | Baldwin | Jan. 11, 1910 |
| 1,618,982 | Hahnemann | Mar. 2, 1927 |